United States Patent
Yang (10) Patent No.: US 10,550,013 B2
(45) Date of Patent: Feb. 4, 2020

(54) WATER FILTRATION SYSTEM

(71) Applicants: FOSHAN SHUNDE MIDEA WATER DISPENSER MFG. CO., LTD., Foshan (CN); MIDEA GROUP CO., LTD., Foshan (CN)

(72) Inventor: Lyu Yang, Foshan (CN)

(73) Assignees: FOSHAN SHUNDE MIDEA WATER DISPENSER MFG. CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 108 days.

(21) Appl. No.: 15/862,486

(22) Filed: Jan. 4, 2018

(65) Prior Publication Data

US 2018/0257958 A1 Sep. 13, 2018

Related U.S. Application Data

(63) Continuation of application No. PCT/CN2017/087308, filed on Jun. 6, 2017.

(30) Foreign Application Priority Data

Mar. 7, 2017 (CN) .......................... 2017 1 0132133
Mar. 7, 2017 (CN) ..................... 2017 2 0219930 U (51) Int. Cl.
*C02F 1/44* (2006.01)

(52) U.S. Cl.
CPC .............. *C02F 1/441* (2013.01); *C02F 1/442* (2013.01); *C02F 2201/004* (2013.01); *C02F 2201/005* (2013.01); *C02F 2201/006* (2013.01)

(58) Field of Classification Search
None
See application file for complete search history.

(56) References Cited

U.S. PATENT DOCUMENTS

2003/0205136 A1* 11/2003 McNulty ............ B01D 19/0005
                                                           95/265
2005/0139530 A1*  6/2005 Heiss ......................... C02F 9/00
                                                           210/85
2009/0173683 A1*  7/2009 Burrows ................ B01D 61/04
                                                           210/234

FOREIGN PATENT DOCUMENTS

AU            692750 B3    6/1998
CN         203728658 U     7/2014
(Continued)

OTHER PUBLICATIONS

Midea, International search report and written opinion, PCT/CN2017087308, dated Dec. 8, 2017, 13 pgs. (No Translation Available).

(Continued)

*Primary Examiner* — Richard C Gurtowski
(74) *Attorney, Agent, or Firm* — Morgan, Lewis & Bockius LLP (57) ABSTRACT

A water filtration system (100) includes: a raw-water inlet (100a); a pure-water outlet (100b); a purified-water outlet (100c); a waste-water outlet (100d); an integrated filter cartridge (1); and a return flow path (101). The integrated filter cartridge (1) has a first port (10a), a second port (10b), a third port (10c) and a fourth port (10d). The purified-water outlet (100c) and the waste-water outlet (100d) both are connected to the third port (10c), and a water storage device (2) is provided to at least one of the fourth port (10d) and a flow path connected to the pure-water outlet (100b). The return flow path (101) has a first end connected between the first port (10a) and the raw-water inlet (100a) and a second end connected between the waste-water outlet (100d) and the third port (10c).

9 Claims, 1 Drawing Sheet

(56) References Cited

FOREIGN PATENT DOCUMENTS

| | | |
|---|---|---|
| CN | 204625367 U | 9/2015 |
| CN | 105600965 A | 5/2016 |
| CN | 205516831 U | 8/2016 |
| CN | 205635100 U | 10/2016 |
| KR | 10-0153587 B1 | 10/1998 |
| KR | 10-0947761 B1 | 3/2010 |

OTHER PUBLICATIONS

Notification of Reason for Refusal, KR10-20177024211, dated Nov. 21, 2018, 16 pgs.

* cited by examiner

WATER FILTRATION SYSTEM

PRIORITY CLAIM AND RELATED APPLICATION

This application is a continuation application of PCT/CN2017/087308, entitled "WATER FILTRATION SYSTEM" filed on Jun. 6, 2017, which claims priority to Chinese Patent Application No. 201710132133.8, filed with the State Intellectual Property Office of the People's Republic of China on Mar. 7, 2017, and entitled "WATER FILTRATION SYSTEM", and Chinese Patent Application No. 201720219930.5, filed with the State Intellectual Property Office of the People's Republic of China on Mar. 7, 2017, and entitled "WATER FILTRATION SYSTEM", all of which are incorporated herein by reference in their entirety.

TECHNICAL FIELD

The present disclosure relates to a technical field of water purification, and more particularly to a water filtration system.

BACKGROUND

In the related art, in order to ensure a service life of a fine filter cartridge of a water filtration system of a water purifier, a recycling rate of the water filtration system (a ratio of a pure water flow rate to a raw water flow rate) usually is low, so that pure water flux of the water filtration system is small, thus causing waste of water resources.

SUMMARY

Embodiments of the present disclosure seek to solve at least one of the problems existing in the related art. Thus, the present disclosure provides a water filtration system, which improves a recycling rate of the water filtration system under the premise of ensuring a service life of a fine filter cartridge.

The water filtration system according to embodiments of the present disclosure includes: a raw-water inlet, a pure-water outlet, a purified-water outlet, a waste-water outlet, an integrated filter cartridge and a return flow path. The integrated filter cartridge includes a pre-filter cartridge, a fine filter cartridge and a post filter cartridge, and has a first port, a second port, a third port and a fourth port. The first port is connected to the raw-water inlet, the second port is connected to the pure-water outlet, and the purified-water outlet and the waste-water outlet both are connected to the third port. A water storage device is connected to at least one of the fourth port and a flow path connected to the pure-water outlet. A raw water entering through the raw-water inlet is configured to flow out of the pure-water outlet after being filtered by the pre-filter cartridge, the fine filter cartridge and the post filter cartridge successively. The raw water entering through the raw-water inlet is configured to flow out of the purified-water outlet after being only filtered by the pre-filter cartridge. The return flow path has a first end connected between the first port and the raw-water inlet and a second end connected between the waste-water outlet and the third port.

In the water filtration system according to embodiments of the present disclosure, by providing the return flow path to the water filtration system, the recycling rate of the water filtration system is improved under the premise of ensuring the service life of the fine filter cartridge. Furthermore, by providing the water storage device to at least one of the fourth port and the flow path connected to the pure-water outlet of the water filtration system, a requirement of the user for a large amount of water can be satisfied. Moreover, it is possible for the water filtration system to obtain the pure water and the purified water of two different water qualities, thus improving a utilization rate of water resources and achieving a water saving.

According to some embodiments of the present disclosure, the return flow path is provided with a throttle valve, so that a water-intake pressure in the integrated filter cartridge before the fine filter cartridge is maintained.

According to some embodiments of the present disclosure, the return flow path is provided with a switch configured to communicate the first end of the return flow path with the second end of the return flow path and to disconnect the first end of the return flow path from the second end of the return flow path. Thus, a waste water flux of the water filtration system is reduced, and a pure water flux of the water filtration system is improved.

According to some embodiments of the present disclosure, a waste-water valve is provided in a flow path connected to the waste-water outlet, so that the water-intake pressure in the integrated filter cartridge before the fine filter cartridge may be further maintained.

According to some embodiments of the present disclosure, a water-intake valve and a booster pump are provided between the first port and the raw-water inlet, the water-intake valve is located upstream of the booster pump, and the first end of the return flow path is located between the water-intake valve and the booster pump. Thus, it is possible for the water filtration system to obtain the pure water and the purified water of two different water qualities, thus improving the utilization rate of water resources. In addition, a normal operation of the water filtration system can be ensured by providing the return flow path.

According to some embodiments of the present disclosure, the water storage device is provided with a detection device, and the detection device includes at least one of a pressure detection device and a liquid level detection device. When the detection device detects that the water storage device is not full of liquid, a controller of the water filtration system opens the water-intake valve and the booster pump. Thus, an automatic water storage function of the water filtration system is achieved.

According to some embodiments of the present disclosure, a pre-filter mesh is provided between the raw-water inlet and the water-intake valve. Thus, the pre-filter mesh can protect the water-intake valve and the booster pump.

According to some embodiments of the present disclosure, the third port includes a first sub-port and a second sub-port independent from each other, and the purified-water outlet is connected to the first sub-port and the waste-water outlet is connected to the second sub-port. Thus, the utilization rate of the water resources can be improved.

According to some embodiments of the present disclosure, a first one-way valve and a first high-pressure switch are provided between the second port and the pure-water outlet, and the first one-way valve and the first high-pressure switch are integrated into one piece. A second one-way valve and a second high-pressure switch are provided between the third port and the purified-water outlet, and the second one-way valve and the second high-pressure switch are integrated into one piece. Thus, parts and components of the water filtration system can be reduced and hence the water filtration system can be simplified.

According to some embodiments of the present disclosure, the water storage device is configured as a water storage bag, a pressure tank or a water tank. Thus, the water storage device can be selected and configured according to practical situations to greatly satisfy the practical requirements.

According to some embodiments of the present disclosure, the fine filter cartridge is configured as a reverse osmosis filter cartridge or a nanofiltration membrane filter cartridge. Thus, the water quality of the pure water is ensured, and further health of the user is also ensured.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

100: water filtration system;
100a: raw-water inlet; 100b: pure-water outlet;
100c: purified-water outlet; 100d: waste-water outlet;
101: return flow path; 102: raw-water flow path; 103: pure-water flow path;
104: purified-water flow path; 105: waste-water flow path; 106: water-storage flow path;
1: integrated filter cartridge; 10a: first port; 10b: second port;
10c: third port; 10d: fourth port;
2: water storage device; 3: throttle valve; 4: waste-water solenoid valve;
5: water-intake valve; 6: booster pump; 7: pre-filter mesh;
8: first one-way-valve high-pressure switch; 9: second one-way-valve high-pressure switch;
10: pure-water valve; 11: purified-water valve.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

Thus, features limited by "first" and "second" are intended to indicate or imply including one or more than one these features. In the description of the present disclosure, the term "a plurality of" means two or more than two, unless specified otherwise.

In the present disclosure, unless specified or limited otherwise, the terms "connected," "coupled" and the like are used broadly, and may be, for example, fixed connections, detachable connections, or integral connections; may also be mechanical or electrical connections; may also be direct connections or indirect connections via intervening structures; may also be inner communications of two elements. These having ordinary skills in the art should understand the specific meanings in the present disclosure according to specific situations.

A water filtration system 100 according to embodiments of the present disclosure will be described below with reference to FIG. 1.

Figure 1:
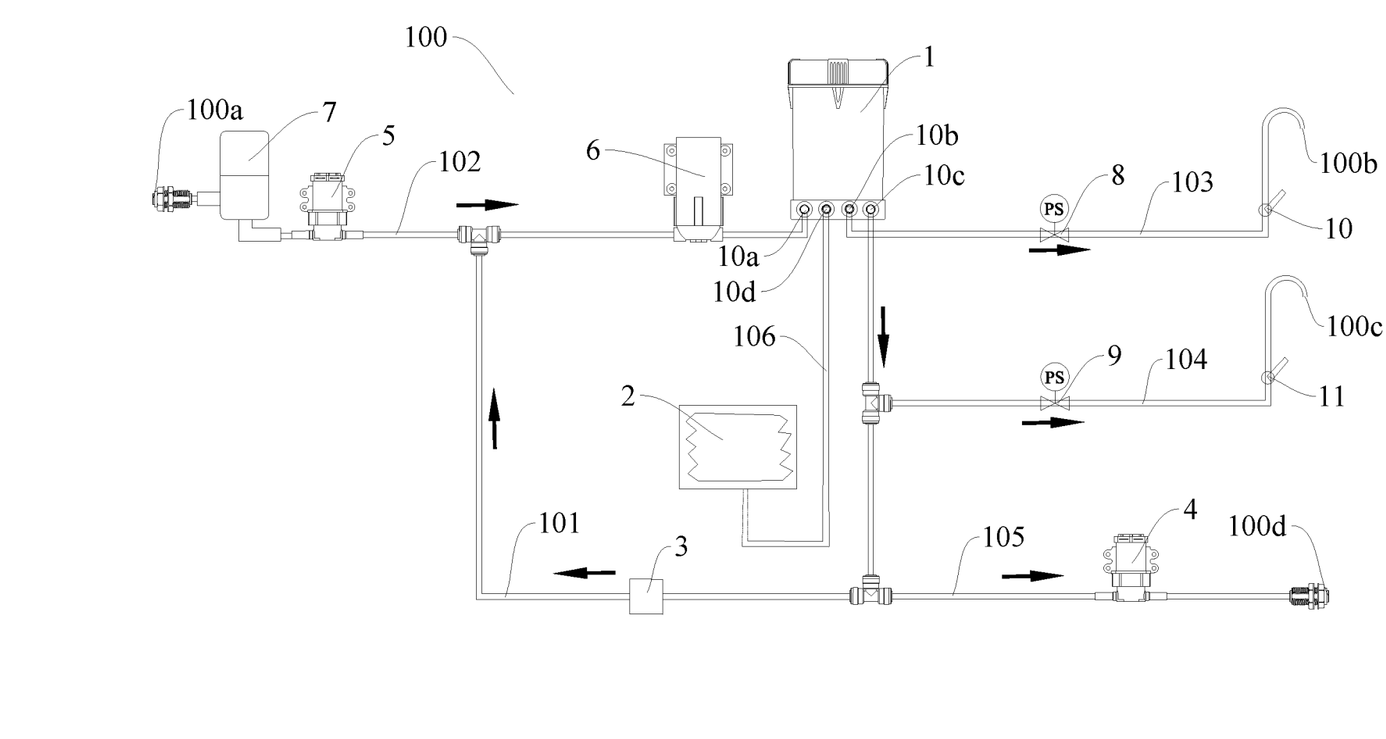
FIG. 1 is a schematic view of a water filtration system according to an embodiment of the present disclosure.

As illustrated in FIG. 1, the water filtration system 100 according to embodiments of the present disclosure includes: a raw-water inlet 100a, a pure-water outlet 100b, a purified-water outlet 100c, a waste-water outlet 100d, an integrated filter cartridge 1 and a return flow path 101.

The integrated filter cartridge 1 includes a pre-filter cartridge, a fine filter cartridge and a post filter cartridge. The integrated filter cartridge 1 has a first port 10a, a second port 10b, a third port 10c and a fourth port 10d. The first port 10a is connected to the raw-water inlet 100a. The second port 10b is connected to the pure-water outlet 100b. The purified-water outlet 100c and the waste-water outlet 100d are both connected to the third port 10c, and a water storage device 2 is provided to at least one of a flow path connected to the pure-water outlet 100b and the fourth port 10d. After being filtered by the pre-filter cartridge, the fine filter cartridge and the post filter cartridge successively, raw water entering through the raw-water inlet 100a is configured to flow out of the pure-water outlet 100b. After only being filtered by the pre-filter cartridge, the raw water entering through the raw-water inlet 100a is configured to flow out of the purified-water outlet 100c. A return flow path 101 has a first end connected between the first port 10a and the raw-water inlet 100a and a second end connected between the waste-water outlet 100d and the third port 10c.

It should be noted herein that "pure water" is obtained after the raw water is filtered by the pre-filter cartridge, the fine filter cartridge and the post filter cartridge of the integrated filter cartridge 1, and "pure water" can be drunk directly. Moreover, "purified water" is obtained after the raw water is only filtered by the pre-filter cartridge of the integrated filter cartridge 1, and "purified water" can serve as domestic water, such as water for washing clothes, flushing a toilet, etc.

For example, as illustrated in FIG. 1, the water filtration system 100 may further include a raw-water flow path 102, a pure-water flow path 103, a purified-water flow path 104, a waste-water flow path 105 and a water-storage flow path 106. Specifically, the first port 10a of the integrated filter cartridge 1 is connected to the raw-water inlet 100a through the raw-water flow path 102, the second port 10b of the integrated filter cartridge 1 is connected to the pure-water outlet 100b through the pure-water flow path 103, the third port 10c of the integrated filter cartridge 1 is connected to the purified-water outlet 100c through the purified-water flow path 104, and the third port 10c of the integrated filter cartridge 1 is connected to the waste-water outlet 100d through the waste-water flow path 105. The water storage device 2 is disposed in the water-storage flow path 106, and the water storage device 2 is connected to the fourth port 10d of the integrated filter cartridge 1 through the water-storage flow path 106. Further, a pure-water valve 10 may be provided at the pure-water outlet 100b to open or close the pure-water outlet 100b. Also, a purified-water valve 11 may be provided at the purified-water outlet 100c to open or close the purified-water outlet 100c. The first end of the return flow path 101 may be connected to the raw-water flow path 102, and the second end of the return flow path 101 may be connected to the waste-water flow path 105.

When the pure water is needed, the pure-water valve 10 may be opened, and the purified-water valve 11 remains in a closed state. The raw water flows from the raw-water inlet 100a into the integrated filter cartridge 1 after passing through the raw-water flow path 102 and the first port 10a successively. Then, the pure water is obtained after the raw water is filtered by the pre-filter cartridge, the fine filter cartridge and the post filter cartridge successively. The pure water flows out of the integrated filter cartridge 1 via the second port 10b, then flows through the pure-water flow path 103 and further flows out of the pure-water outlet 100b for use by a user. The pure water can directly serve as drinking water. In this process, the waste water produced flows out of the integrated filter cartridge 1 via the third port 10c, a part of the waste water flows through the waste-water flow path 105 and further out of the waste-water outlet 100d, and another part of the waste water returns to the raw-water flow path 102 through the return flow path 101, and flows into the integrated filter cartridge 1 to be filtered via the first port 10a together with the raw water. Since part of the waste water of the water filtration system 100 is recycled to merge with the raw water, such part of the waste water can be filtered once again by the integrated filter cartridge 1, so that a filtering burden of the fine filter cartridge will not be increased, thus ensuring a service life of the fine filter cartridge, improving the recycling rate of the water filtration system 100, promoting a pure-water flux of the water filtration system 100, and achieving the water saving. The raw water entering via the first port 10a can be preliminarily filtered by the pre-filter cartridge. For example, the pre-filter cartridge can effectively remove rust, sediment and colloid in the water, and also absorb residual chlorine and partial organic matter in the water. The water preliminarily filtered by the pre-filter cartridge can be finely filtered by the fine filter cartridge. For example, the fine filter cartridge can effectively remove bacteria, viruses, heavy metal ions and the like in the water. The water finely filtered by the fine filter cartridge can be further filtered by the post filter cartridge. For example, the post filter cartridge can effectively remove residual chlorine and organic matter to improve the taste of water.

When the purified water is needed, the purified-water valve 11 can be opened, and the pure-water valve 10 remains in a closed state. The raw water flows from the raw-water inlet 100a into the integrated filter cartridge 1 after passing through the raw-water flow path 102 and the first port 10a successively. Then, the purified water is obtained after the raw water is filtered by the pre-filter cartridge. The purified water flows out of the integrated filter cartridge 1 via the third port 10c, passes through the purified-water flow path 104 and further flows out of the purified-water outlet 100c. The purified water can serve as daily domestic water for the user, such as the water for washing clothes, etc. In this process, a small amount of waste water or almost no waste water is produced.

As can be seen from above, it is possible for the water filtration system 100 to obtain the pure water and the purified water of two different water qualities, which may be used for different purposes, so that the water resources may be fully used, a utilization rate of the water resources may be improved, and the water saving may be achieved.

When a large amount of water is needed, a certain amount of water can be stored in the water storage device 2 in advance. Specifically, the pure-water valve 10 can be closed, and meanwhile the purified-water valve 11 can be closed. The raw water flows from the raw-water inlet 100a into the integrated filter cartridge 1 after passing through the raw-water flow path 102 and the first port 10a successively, then flows out of the integrated filter cartridge 1 via the fourth port 10d after being filtered by the pre-filter cartridge and the fine filter cartridge, and finally flows through the water-storage flow path 106 into the water storage device 2 to be stored until the water storage device 2 is full of water. In this process, the waste water produced can also flow out of the integrated filter cartridge 1 via the third port 10c, a part of the waste water flows through the waste-water flow path 105 and further out of the waste-water outlet 100d, and another part of the waste water returns to the raw-water flow path 102 through the return flow path 101 and flows into the integrated filter cartridge 1 to be filtered via the first port 10a together with the raw water. By providing the water storage device 2, when the pure-water valve 10 is opened and the purified-water valve 11 remains in the closed state, the water storage device 2 can afresh feed the water in the water storage device 2 through the water-storage flow path 106 into the integrated filter cartridge 1 via the fourth port 10d by means of pressure (for example, a pressure applied to the water in the water storage device 2 by the user or other devices) or other powers. Then, the pure water is obtained after the water is filtered by the post filter cartridge, and flows through the pure-water flow path 103 and further out of the pure-water outlet 100b, so as to satisfy the requirement of the user for a large amount of water.

Certainly, the present disclosure is not limited to this. The water-storage flow path 106 at the fourth port 10d and the pure-water flow path 103 can be provided with the water storage device 2 separately (not illustrated), so as to further satisfy the requirement of the user for a large amount of water. Alternatively, the water filtration system 100 may not include the water-storage flow path 106, in which case the water storage device 2 can be disposed in the pure-water flow path 103 (not illustrated). In this case, the requirement of the user for a large amount of water can also be well satisfied and the water filtration system 100 has relatively few components, thus reducing the occupied space of the whole water filtration system 100 and saving the costs.

In the water filtration system 100 according to embodiments of the present disclosure, the water filtration system 100 is provided with the return flow path 101, the first end of the return flow path 101 is connected between the first port 10a and the raw-water inlet 100a, and the second end of the return flow path 101 is connected between the waste-water outlet 100d and the third port 10c, so that part of the waste water of the water filtration system 100 can be recycled so as to flow into the integrated filter cartridge 1 again to be filtered. Thus, under the premise of ensuring the service life of the fine filter cartridge, the recycling rate of the water filtration system 100 is improved, and the water saving is achieved. Furthermore, by providing the water storage device 2 to at least one of the flow path connected to the pure-water outlet 100b and the fourth port 10d of the water filtration system 100, the requirement of the user for a large amount of water can be satisfied. Moreover, the integrated filter cartridge 1 is provided with the first port 10a, the second port 10b, and the third port 10c, the first port 10 is connected to the raw-water inlet 100a of the water filtration system 100, the second port 10b is connected to the pure-water outlet 100b, and the purified-water outlet 100c and the waste-water outlet 100d are both connected to the third port 10c, so that it is possible for the water filtration system 100 to obtain the pure water and the purified water of two different water qualities, which may be used for different purposes, thus allowing the water resources to be fully used, improving the utilization rate of the water resources, and achieving the water saving. In addition, by employing the integrated filter cartridge 1 composite of the pre-filter cartridge, the fine filter cartridge and the post filter cartridge, the integrated filter cartridge is configured as an integrated structure, so that it is convenient for replacement of the integrated filter cartridge 1, a volume of the integrated filter cartridge 1 is reduced, and also the connection among flow paths of the water filtration system 100 is simplified, so as to improve the applicability of the water filtration system 100.

In some embodiments of the present disclosure, as illustrated in FIG. 1, the return flow path 101 is provided with a throttle valve 3. The throttle valve 3 is used to throttle the waste water in the return flow path 101, so that a water-inlet pressure in the integrated filter cartridge 1 before the fine filter cartridge can be maintained.

Further, a flow path connected to the waste-water outlet 100d is provided with a waste-water valve, and the waste-water valve is configured to open or close the waste-water outlet 100d. Optionally, the waste-water valve may be a waste-water solenoid valve 4, and the waste-water solenoid valve 4 is in a normally off state, in which case a small hole is formed in the waste-water solenoid valve 4 to ensure the circulation of water in the waste-water flow path 105, and also to maintain the water-inlet pressure in the integrated filter cartridge 1 before the fine filter cartridge. It should be understood that, the specific structure and the working principle of the waste-water solenoid valve 4 is well known by those skilled in the art, which will not be described herein. Certainly, the waste-water valve may also be a manual waste-water valve, but not limited to this.

For example, in an example illustrated in FIG. 1, the return flow path 101 is provided with the throttle valve 3, and the flow path connected to the waste-water outlet 100d is provided with the waste-water solenoid valve 4. The throttle valve 3 can throttle the waste water in the return flow path 101, and the waste-water solenoid valve 4 can throttle the waste water in the waste-water flow path 105, so that the water-inlet pressure in the integrated filter cartridge 1 before the fine filter cartridge can be maintained. Furthermore, the return flow path 101 allows part of the waste water to flow back to the raw-water flow path 102, and to further flow into the integrated filter cartridge 1 to be filtered, so that the recycling rate of the water filtration system 100 is improved, and the pure water flux of the water filtration system 100 is promoted.

Optionally, the return flow path 101 may be provided with a switch (not illustrated) configured to communicate the first end of the return flow path 101 with the second end of the return flow path 101 and to disconnect the first end of the return flow path 101 from the second end of the return flow path 101. When the water quality of the raw water is good without increasing the filtering burden of the fine filter cartridge or when a water consumption of the user is too large, the switch in the return flow path 101 may be open to disconnect the first end of the return flow path 101 with the second end of the return flow path 101. In this case, the waste water produced by the water filtration system 100 can pass through the waste-water flow path 105 and be discharged out of the waste-water outlet 100d. Since the waste water of the water filtration system 100 is throttled only by the waste-water flow path 105, the waste water flux of the water filtration system 100 is reduced, and the pure water flux of the water filtration system 100 is improved. When the water quality of the raw water is poor, the switch in the return flow path 101 needs to be closed to communicate the first end of the return flow path 101 with the second end of the return flow path 101. In this case, a part of the waste water produced by the water filtration system 100 flows through the waste-water flow path 105 and further out of the waste-water outlet 100d, and another part of the waste water flows back to the raw-water flow path 102 through the return flow path 101 and further flows into the integrated filter cartridge 1 to be filtered via the first port 10a together with the raw water, so that the recycling rate of the water filtration system 100 is improved, and the pure water flux of the water filtration system 100 is enhanced. It should be understood that, when the switch above is disposed in the return flow path 101, the throttle valve 3 may also be disposed in the return flow path 101 or not, which both will enhance the pure water flux of the water filtration system 100.

It should be understood that, a flow control valve (not illustrated), such as a flow control solenoid valve, may be provided in the return flow path 101. The flow control valve can be adjusted based on parameters, such as the water quality of the raw water, to adjust the waste water flux in the return flow path 101, so that under the premise of ensuring the service life of the fine filter cartridge, the pure water flux of the water filtration system 100 is improved and the water saving is achieved. For example, when the water quality of the raw water is good, the waste water flux in the return flow path 101 can be reduced by adjusting the flow control valve, while when the water quality of the raw water is poor, the waste water flux in the return flow path 101 can be increased by adjusting the flow control valve, which both can improve the recycling rate of the water filtration system 100.

As illustrated in FIG. 1, a water-intake valve 5 and a booster pump 6 are provided between the first port 10a and the raw-water inlet 100a. The water-intake valve 5 is located upstream of the booster pump 6, and the first end of the return flow path 10a is located between the water-intake valve 5 and the booster pump 6. It should be noted that the "upstream" may be construed as upstream of a flow direction of the water. For example, the water-intake valve 5 and the booster pump 6 may be disposed in the raw-water flow path 102 and spaced apart from each other. The water-intake valve 5 is configured to block or unblock the raw-water flow path 102. When the water-intake valve 5 is opened, the raw water can flow through the raw-water flow path 102 into the integrated filter cartridge 1 to be filtered. When the water-intake valve 5 is closed, the raw water cannot flow into the integrated filter cartridge 1. The booster pump 6 is configured to improve a pressure of the raw water to ensure that the purified water obtained after filtration of the pre-filter cartridge can permeate into the fine filter cartridge to be filtered. Specifically, when the water-intake valve 5 and the booster pump 6 are opened, the raw water flowing to the integrated filter cartridge 1 has a large pressure, so that the purified water obtained after filtration of the pre-filter cartridge can permeate into the fine filter cartridge to be filtered smoothly. In this case, the pure water obtained flows out of the second port 10b, further passes through the pure-water flow path 103 and finally is discharged out of the pure-water outlet 100b. A part of the waste water can flow through the return flow path back to the raw-water flow path 102 between the water-intake valve 5 and the booster pump 6, and further flow into the integrated filter cartridge 1 to be filtered together with the raw water. When the water-intake valve 5 is opened and the booster pump 6 stops operating, only the purified water can be obtained. In this case, the purified water flows out of the third port 10c, further passes through the purified-water flow path 104, and finally is discharged out of the purified-water outlet 100c. When the water-intake valve 5 is closed, the raw-water flow path 102 is in a blocked state, the water filtration system 100 does not operate in this case. Since the first end of the return flow path 101 is located between the water-intake valve 5 and the booster pump 6, it can be prevented that the raw water flows into the return flow path 101 when the first end of the return flow path 101 is located upstream of the water-intake valve 5, and it can also be prevented that a part of the waste water in the return flow path 101 cannot flow into the integrated filter cartridge 1 due to the pressurization of the booster pump 6 when the first end of the return flow path 101 is located downstream of the booster pump 6. Thus, it is possible for the water filtration system 100 to obtain the pure water and the purified water of two different water qualities, thus improving the utilization rate of water resources. In addition, a normal operation of the water filtration system 100 can be ensured by providing the return flow path 101. The water-intake valve 5 may be selected as a solenoid valve, but not limited to this.

It should be understood that, the water-intake valve 5 and the booster pump 6 may not be provided between the first port 10a and the raw-water inlet 100a. In this case, the waste-water valve is required to be provided to the waste-water flow path 105. The waste-water valve may be selected as a manual waste-water valve, the purified-water valve 11 may be selected as a manual purified-water valve and the pure-water valve 10 may be selected as a manual pure-water valve, so that electrical equipment such as the booster pump 6 is not needed, and it is only required to adjust openings and closings of the manual purified-water valve, the manual pure-water valve and the manual waste-water valve during the use of the water filtration system 100, which simplifies the water filtration system 100 and achieves the purpose of saving electricity and costs. Specifically, when the purified water is needed, the manual purified-water valve can be opened, and the manual pure-water valve remains in the closed state, so that the raw water flows through the raw-water flow path 102 and further into the integrated filter cartridge 1 to be filtered via the first port 10a, and the purified water obtained after filtration flows out of the third port 10c, further passes through the purified-water flow path 104 and finally is discharged out of the purified-water outlet 100c for use by the user, in which case almost no waste water is produced, and thus the manual waste-water valve can remain in the closed state. When the pure water is needed, the manual pure-water valve is opened, the manual waste-water valve is opened, and the manual purified-water valve remains in the closed state, so that the raw water can permeate into the fine filter cartridge to be filtered, and the pure water obtained after filtration flows out of the integrated filter cartridge 1 via the second port 10b, further passes through the pure-water flow path 103 and finally flows out of the pure-water outlet 100b for use by the user. A part of the waste water produced flows through the waste-water flow path 105 and further out of the waste-water outlet 100d, and another part of the waste water produced flows back to the raw-water flow path 102 through the return flow path 101 and further flows into the integrated filter cartridge 1 to be filtered together with the raw water.

Similarly, only the water-intake valve 5 may be provided between the first port 10a and the raw-water inlet 100a, while the booster pump 6 may not be provided between the first port 10a and the raw water outlet 100a. The water-intake valve 5 may be selected as a manual water-intake valve, the purified-water valve 11 may be selected as a manual purified-water valve, and the pure-water valve 10 may be selected as a manual pure-water valve, so that it is only required to adjust openings and closings of the manual water-intake valve, the manual purified-water valve, the manual pure-water valve and the manual waste-water valve during the use of the water filtration system 100, which simplifies the water filtration system 100 and also achieves the purpose of saving electricity and costs. Specifically, when the purified water is needed, the manual water-intake valve can be opened, the manual purified-water valve can be opened, and the manual pure-water valve remains in the closed state, so that the raw water flows through the raw-water flow path 102 and further into the integrated filter cartridge 1 to be filtered via the first port 10a, and the purified water obtained after filtration flows out of the third port 10c, further passes through the purified-water flow path 104 and finally flows out of the purified-water outlet 100c for use by the user, in which case almost no waste water is produced. When the pure water is needed, the manual water-intake valve can be opened, the manual pure-water valve can be opened, and the manual purified-water valve remains in the closed state, so that the raw water can permeate into the fine filter cartridge to be filtered, and the pure water obtained after filtration flows out of the integrated filter cartridge 1 via the second port 10b, further passes through the pure-water flow path 103 and finally flows out of the pure-water outlet 100b for use by the user. A part of the waste water produced flows through the waste-water flow path 105 and further out of the waste-water outlet 100d, and another part of the waste water produced flows back to the raw-water flow path 102 through the return flow path 101 and further flows into the integrated filter cartridge 1 to be filtered together with the raw water. However, the present disclosure is not limited to this.

Further, the water storage device 2 may be provided with a detection device (not illustrated). The detection device includes at least one of a pressure detection device and a liquid level detection device. When the detection device detects that the water storage device 2 is not full of the liquid, a controller (not illustrated) of the water filtration system 100 opens the water-intake valve 5 and the booster pump 6. Thus, by providing the water storage device 2 with the detection device that can detect whether the water storage device 2 is full of the liquid, an automatic water storage function of the water filtration system 100 can be achieved so as to satisfy a requirement of water supply.

For example, as illustrated in FIG. 1, the pure-water valve 10 is closed, the purified-water valve 11 is closed, and the detection device can detect whether the water stored in the water storage device 2 fills up the water storage device 2. When the detection device detects that the water storage device 2 is not full of the water, a signal is transmitted to the controller by the detection device, and the controller opens the water-intake valve 5 and the booster pump 6, so that the raw water can flow into the integrated filter cartridge 1 to be filtered by the pre-filter cartridge and the fine filter cartridge, then the water after filtration flows out of the integrated filter cartridge 1 via the fourth port 10d, and finally flows through the water-storage flow path 106 into the water storage device 2 for storage until the water storage device 2 is full. When the detection device detects that the water storage device 2 is full of the water, a signal is transmitted to the controller, and the controller controls the water-intake valve 5 to close and controls the booster pump 6 to stop operating.

Optionally, the pressure detection device is configured as a pressure sensor, and the liquid level detection device is configured as a liquid level sensor. The pressure sensor may be configured to detect a pressure of the liquid in the water storage device 2, and the liquid level sensor may be configured to detect a liquid level of the liquid in the water storage device 2, so that the water filtration system 100 is more intelligent, which brings great convenience to the user.

When the pressure detection device is configured as the pressure sensor, if the pressure detected by the pressure sensor is smaller than a predetermined value of the pressure (for example, when the water storage device 2 is full of the liquid, the pressure of the liquid is set as the predetermined value), the controller controls the water-intake valve 5 to open and controls the booster pump 6 to start, so that the raw water is filtered by the pre-filter cartridge and the fine filter cartridge, and the water after filtration flows into the water storage device 2, until the water storage device 2 is full of the water, in which case the pressure detected by the pressure sensor reaches the predetermined value of the pressure, and the controller controls the water-intake valve 5 to close and controls the booster pump 6 to stop operating.

When the liquid level detection device is configured as the liquid level sensor, if the liquid level detected by the liquid level sensor is smaller than a predetermined value of the liquid level (for example, when the water storage device 2 is full of the liquid, the liquid level of the liquid is set as the predetermined value), the controller controls the water-intake valve 5 to open and controls the booster pump 6 to start, so that the raw water is filtered by the pre-filter cartridge and the fine filter cartridge, the water after filtration flows into the water storage device 2, and thus the amount of the water in the water storage device 2 increases gradually until the water storage device 2 is full of the water, in which case the liquid level detected by the liquid level sensor reaches the predetermined value of the liquid level, and the controller controls the water-intake valve 5 to close and controls the booster pump 6 to stop operating.

It should be understood that, the water storage device 2 may not be provided with the detection device. For example, the water storage device 2 may be transparent, so that the user can observe the water level in the water storage device 2 directly. When the water storage device 2 is not full of the liquid, i.e. the water level is low, the above manual water-intake valve may be opened, and the manual pure-water valve and the manual purified-water valve both may remain in the closed state, so as to achieve the water storage function of the water storage device 2. However, the present disclosure is not limited to this. Thus, the detection of the water storage amount of the water storage device 2 may be achieved without electrical detection devices (such as the pressure sensor and the liquid level sensor) during the use of the water filtration system 100, thereby further saving electricity and reducing costs.

In a further embodiment of the present disclosure, as illustrated in FIG. 1, a pre-filter mesh 7 is provided between the raw-water inlet 100a and the water-intake valve 5, and the pre-filter mesh 7 is configured to filter out macroscopic objects in the raw water, for example large particle impurities such as rust, so that the raw-water flow path 102 can be prevented from being blocked, and the water-intake valve 5 and the booster pump 6 can be prevented from being worn due to the impurities in the raw water, so as to protect the water-intake valve 5 and the booster pump 6.

In some embodiments of the present disclosure, the third port 10c includes a first sub-port and a second sub-port (not illustrated) independent from each other. The purified-water outlet 100c is connected to the first sub-port and the waste-water outlet 100d is connected to the second sub-port. In this case, the purified-water outlet 100c is connected to the first sub-port via the purified-water flow path 104, and the waste-water outlet 100d is connected to the second sub-port via the waste-water flow path 105. The purified-water flow path 104 and the waste-water flow path 105 are two flow paths independent from each other. Since the first sub-port and the second sub-port are independent from each other, all of the purified water obtained after filtration of the pre-filter cartridge can flow out of the purified-water outlet 100c and no waste water flows out, thus improving the utilization rate of the water resources. Certainly, the purified-water flow path 104 and the waste-water flow path 105 may share a partial flow path. For example, in the example illustrated in FIG. 1, the purified-water flow path 104 and the waste-water flow path 105 may be connected by means of a first three-way pipe, and the waste-water flow path 105 and the return flow path 101 may be connected by means of a second three-way pipe. A first end of the first three-way pipe is connected to the third port 10c and other two ends of the first three-way pipe are connected to the purified-water outlet 100c and a first end of the second three-way pipe respectively. Other two ends of the second three-way pipe are connected to the second end of the return flow path 101 and the waste-water outlet 100d respectively. In this way, it is possible to reduce joints in the pipelines, simplify the water flow paths of the water purification system 100 and improve the reliability of the water purification system 100.

In some embodiments of the present disclosure, a first one-way valve and a first high-pressure switch are provided between the second port 10b and the pure-water outlet 100b, and the first one-way valve and the first high-pressure switch are integrated into one piece. A second one-way valve and a second high-pressure switch are provided between the third port 10c and the purified-water outlet 100c, and the second one-way valve and the second high-pressure switch are integrated into one piece. The first one-way valve can prevent the pure water in the pure-water flow path 103 from flowing back into the integrated filter cartridge 1, and the second one-way valve can prevent the purified water in the purified-water flow path 104 from flowing back into the integrated filter cartridge 1. The first high-pressure switch and the second high-pressure switch can detect pressures at their locations and transmit a detection signal to the controller, and the controller controls operations of the water-intake valve 5 and the booster pump 6, so that feedback controls of the water-intake valve 5 and the booster pump 6 are achieved.

For example, in the example illustrated in FIG. 1, the first one-way valve and the first high-pressure switch between the second port 10b and the pure-water outlet 100b are integrated into a first one-way-valve high-pressure switch 8. A second one-way-valve high-pressure switch 9 is provided between the third port 10c and the purified-water outlet 100c, and the second one-way-valve high-pressure switch 9 is integrated by the second one-way valve and the second high-pressure switch. Thus, by integrating the first one-way valve and the first high-pressure switch into one piece, and integrating the second one-way valve and the second high-pressure switch into one piece, parts and components of the water filtration system 100 are reduced, thereby simplifying the water filtration system 100.

When the pure water is needed, the pure-water valve 10 is opened, and the purified-water valve 11 remains in the closed state. The first high-pressure switch detects that the pressure at its location is smaller than a predetermined pressure p1, in which the predetermined pressure p1 satisfies a following formula: $0.2 \text{ MPa} \leq p1 \leq 0.25 \text{ MPa}$, and transmits a signal to the controller, and the controller opens the water-intake valve 5 and the booster pump 6, so that the raw water flows from the raw-water inlet 100a into the integrated filter cartridge 1 after passing through the raw-water flow path 102 and the first port 10a successively, then the pure water is obtained after the raw water is filtered by the integrated filter cartridge 1, and the pure water finally flows out of the pure-water outlet 100b to be directly drunk by the user. Then, the pure-water valve 10 is closed. Since the first one-way valve limits backflow of the water, the pressure at the location of the first high-pressure switch increases gradually. When the foregoing pressure reaches the predetermined pressure p1, the first high-pressure switch transmits a signal to the controller, and the controller controls the water-intake valve 5 to close and controls the booster pump 6 to stop operating. It should be understood that, the predetermined pressure p1 of the first high-pressure switch may be set according to practical situations to greatly satisfy the requirement of the user.

When the purified water is needed, the purified-water valve 11 is opened, and the pure-water valve 10 remains in the closed state. The second high-pressure switch detects that the pressure at its location is smaller than a predetermined pressure p2, in which the predetermined pressure p2 satisfies a following formula: $0.2 \text{ MPa} \leq p2 \leq 0.25 \text{ MPa}$, and transmits a signal to the controller, and the controller opens the water-intake valve 5 and closes the booster pump 6, so that the raw water flows from the raw-water inlet 100a into the integrated filter cartridge 1 after passing through the raw-water flow path 102 and the first port 10a successively, then the purified water is obtained after the raw water is filtered by the pre-filter cartridge of the integrated filter cartridge 1, and the purified water finally flows out of the purified-water outlet 100c to be used by the user. In this case, even if the pure-water valve 10 is opened, no pure water flows out of the pure-water outlet 100b. Then, the purified-water valve 11 is closed. Since the second one-way valve limits backflow of the water, the pressure at the location of the second high-pressure switch increases gradually. When the foregoing pressure reaches the predetermined pressure p2, the second high-pressure switch transmits a signal to the controller, and the controller closes the water-intake valve 5 and the booster pump 6. It should be understood that, the predetermined pressure p2 of the second high-pressure switch may be set according to practical situations to greatly satisfy the requirement of the user.

Certainly, in other embodiments of the present disclosure, the first one-way valve and the first high-pressure switch may also be arranged separately from each other (not illustrated), and the second one-way valve and the second high-pressure switch may also be arranged separately from each other (not illustrated). It should be understood that, only the first one-way valve may be provided between the second port 10b and the pure-water outlet 100b while the first high-pressure switch may not be provided between the second port 10b and the pure-water outlet 100b, and only the second one-way valve may be provided between the third port 10c and the purified-water outlet 100c while the second high-pressure switch may not be provided between the third port 10c and the purified-water outlet 100c, so as to further simplify a structure of the water filtration system 100 and reduce costs.

Optionally, the water storage device 2 is configured as a water storage bag, a pressure tank or a water tank, and so on. The water storage bag or the pressure tank may be connected to the fourth port 10d, and the water tank may be disposed in the pure-water flow path 103, so that the requirement of the user for a large amount of water can be satisfied. The water storage bag is foldable, easy to store and has a small volume. Further, water storage bags of various standards can be customized according to the requirement of the user, so as to greatly satisfy the requirement of the user. The pressure tank is safe and reliable, and has good economy. Furthermore, the pressure tank can utilize compressibility of air in the tank to adjust the amount of the stored water. The water tank has no pollution on the water, thereby ensuring cleanliness and hygiene of the water. Furthermore, the water tank has a high strength, a light weight as well as a neat and artistic appearance, and is easy to clean.

Optionally, the fine filter cartridge is configured as a reverse osmosis filter cartridge or a nanofiltration membrane filter cartridge. Since the reverse osmosis membrane can filter out the bacteria, viruses, heavy metal ions and the like in the water, the reverse osmosis filter cartridge can strictly distinguish the water which passes through the reverse osmosis membrane from the concentrate water which cannot pass through the reverse osmosis membrane. Moreover, the nanofiltration membrane can remove organic matter and chroma in the water, partially remove the dissolved salts, and remove hardness of the water. Furthermore, the nanofiltration membrane filter cartridge can also strictly distinguish the water which passes the nanofiltration membrane from the concentrate water which cannot pass the nanofiltration membrane. Thus, no matter the reverse osmosis filter cartridge or the nanofiltration membrane filter cartridge is used, the fine filter cartridge can obtain a high filtering accuracy, and the water passing through the fine filter cartridge has a good water quality, thereby ensuring the water quality of the pure water and ensuring the health of the user.

After the water filtration system 100 is used for a period of time, the integrated filter cartridge 1 needs to be cleaned, in which case the pure-water valve 10 and the purified-water valve 11 may be closed, the controller opens the water-intake valve 5 and the booster pump 6, and the waste-water solenoid valve 4 is energized (in which case the waste-water solenoid valve 4 is fully opened), so that the raw water flows into the integrated filter cartridge 1 via the first port 10a and flushes the integrated filter cartridge 1, so as to remove the impurities attached to the pre-filter cartridge and the fine filter cartridge of the integrated filter cartridge 1, thus allowing the integrated filter cartridge 1 to continue to be used, thereby extending the service life of the integrated filter cartridge 1.

Certainly, when the water filtration system 100 does not include electrical equipment such as the booster pump 6, the detection device, the first high-pressure switch and the second high-pressure switch, i.e., there is no need to provide electrical energy to the water filtration system 100, the water filtration system 100 can also operate normally. For example, the water-intake valve 5 is configured as the manual water-intake valve, the pure-water valve 10 is configured as the manual pure-water valve, the purified-water valve 11 is configured as the manual purified-water valve, and the waste-water valve is configured as the manual waste-water valve. In this way, when the integrated filter cartridge 1 is to be cleaned, the manual pure-water valve and the manual purified-water valve are closed, while the manual water-intake valve and the manual waste-water valve are opened, in which case the manual waste-water valve is fully opened, so that the raw water flows into the integrated filter cartridge 1 via the first port 10a to flush the pre-filter cartridge and the fine filter cartridge successively, and thus the service life of the integrated filter cartridge 1 may be extended as well.

Other constitutions and operations of the water filtration system 100 according to embodiments of the present disclosure are well known by those skilled in the art, and thus will not be described in detail herein.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. A water filtration system, comprising:
    a raw-water inlet;
    a pure-water outlet;
    a purified-water outlet;
    a waste-water outlet;
    an integrated filter cartridge comprising a pre-filter cartridge, a fine filter cartridge and a post filter cartridge, and having a first port, a second port, a third port and a fourth port, the first port being connected to the raw-water inlet, the second port being connected to the pure-water outlet, the purified-water outlet and the waste-water outlet both being connected to the third port, a water storage device being connected to the fourth port and a flow path connected to the pure-water outlet, raw water entering through the raw-water inlet being configured to flow out of the pure-water outlet after being filtered by the pre-filter cartridge, the fine filter cartridge and the post filter cartridge successively, the raw water entering through the raw-water inlet being configured to flow out of the purified-water outlet after being only filtered by the pre-filter cartridge; and
    a return flow path having a first end connected between the first port and the raw-water inlet and a second end connected between the waste-water outlet and the third port, wherein:
        the return flow path is provided with a throttle valve placed between the first end of the return flow path and the second end of the return flow path,
        a waste-water valve is provided in a flow path connected to the waste-water outlet and placed between the second end of the return flow path and the waste-water outlet, and
        the second end of the return flow path is placed between the throttle valve and the waste-water valve.

2. The water filtration system according to claim 1, wherein the return flow path is provided with a switch configured to communicate the first end of the return flow path with the second end of the return flow path and to disconnect the first end of the return flow path from the second end of the return flow path.

3. The water filtration system according to claim 1, wherein a water-intake valve and a booster pump are provided between the first port and the raw-water inlet, the water-intake valve is located upstream of the booster pump, and the first end of the return flow path is located between the water-intake valve and the booster pump.

4. The water filtration system according to claim 3, wherein the water storage device is provided with a detection device, and the detection device includes at least one of a pressure detection device and a liquid level detection device,
    when the detection device detects that the water storage device is not full of liquid, a controller of the water filtration system opens the water-intake valve and the booster pump.

5. The water filtration system according to claim 3, wherein a pre-filter mesh is provided between the raw-water inlet and the water-intake valve.

6. The water filtration system according to claim 1, wherein the third port includes a first sub-port and a second sub-port independent from each other, and the purified-water outlet is connected to the first sub-port and the waste-water outlet is connected to the second sub-port.

7. The water filtration system according to claim 1, wherein a first one-way valve and a first high-pressure switch are provided between the second port and the pure-water outlet, and the first one-way valve and the first high-pressure switch are integrated into one piece,
    a second one-way valve and a second high-pressure switch are provided between the third port and the purified-water outlet, and the second one-way valve and the second high-pressure switch are integrated into one piece.

8. The water filtration system according to claim 1, wherein the water storage device is configured as one of a water storage bag, a pressure tank and a water tank.

9. The water filtration system according to claim 1, wherein the fine filter cartridge is configured as one of a reverse osmosis filter cartridge and a nanofiltration membrane filter cartridge.

* * * * *